No. 764,605. PATENTED JULY 12, 1904.
F. LAMBERT.
WATER METER.
APPLICATION FILED DEC. 15, 1903.
NO MODEL. 2 SHEETS—SHEET 1.

Attest:
Geo H Botts
Walter Mann

Inventor:
Frank Lambert
by
Edith J. Griswold
Atty

No. 764,605. PATENTED JULY 12, 1904.
F. LAMBERT.
WATER METER.
APPLICATION FILED DEC. 15, 1903.
NO MODEL. 2 SHEETS—SHEET 2.

Attest:
Geo. H. Botts
Walter Mann

Inventor
Frank Lambert
by Edith J. Griswold
Atty

No. 764,605.

Patented July 12, 1904.

UNITED STATES PATENT OFFICE.

FRANK LAMBERT, OF BROOKLYN, NEW YORK.

WATER-METER.

SPECIFICATION forming part of Letters Patent No. 764,605, dated July 12, 1904.

Application filed December 15, 1903. Serial No. 185,222. (No model.)

*To all whom it may concern:*

Be it known that I, FRANK LAMBERT, a citizen of the United States, and a resident of New York city, borough of Brooklyn, Kings county, State of New York, have invented Improvements in Water-Meters, of which the following is a specification.

This invention relates to water-meters, and has for its object to provide means for totalizing and registering the measurement of water passing through the meter, which means will prevent accidental or fraudulent subtraction or change from the true registration.

Water-meters in common use are capable of being connected up in the service-pipe in either direction—that is, the meter may be so connected to the service-pipe that water will flow in at the outlet of the meter and out at its inlet, which causes the measuring device to rotate in a direction to run the register backward instead of forward.

By my present invention I provide means whereby the registering-indexes, or some of them, are kept moving in the same constant direction regardless in which direction the measuring device may operate. If desired, I may also cause this registering mechanism to run forward at a faster rate when the meter is reversed than when it is connected up normally. Thus fraudulent or accidental reversal of the meter will not allow the register to run backward. Another way of changing from a true registration is to break the glass over the registers and either turn the wheels of the mechanism backward, where possible, or when backward motion is prevented to turn the wheels forward until the highest indication is reached and passed and the index reaches zero again in its forward motion. To circumvent any such practice, the measuring and registering devices comprise interlocking parts that prevent independent motion of any of the parts, and consequently the register can only be moved by the motion of the measuring device.

In the accompanying drawings I have shown two ways of carrying my invention into effect; but I do not limit myself to any particular means for accomplishing my object of having the register totalize and register all the water passing through the meter in either direction.

Figure 1:
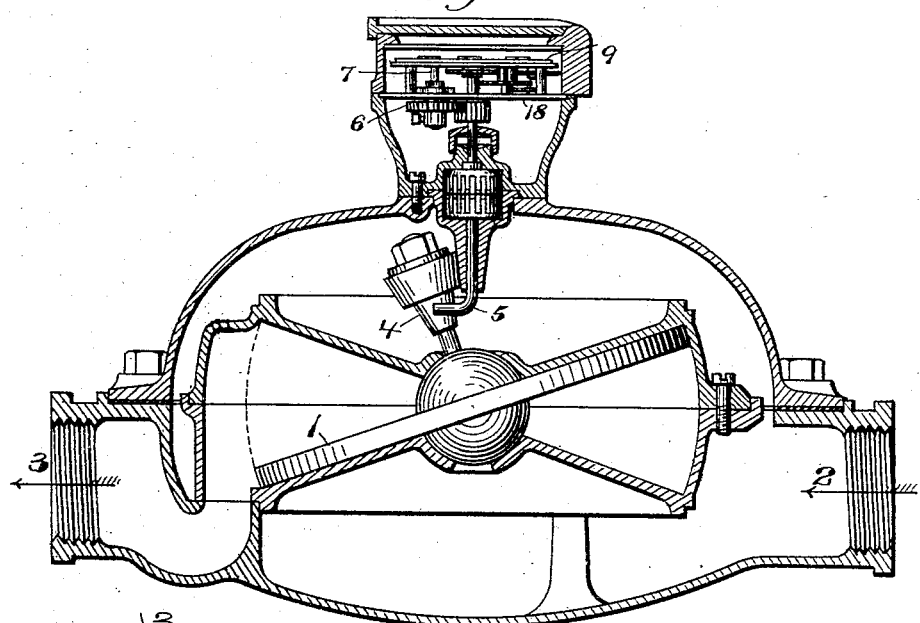
Figure 2:
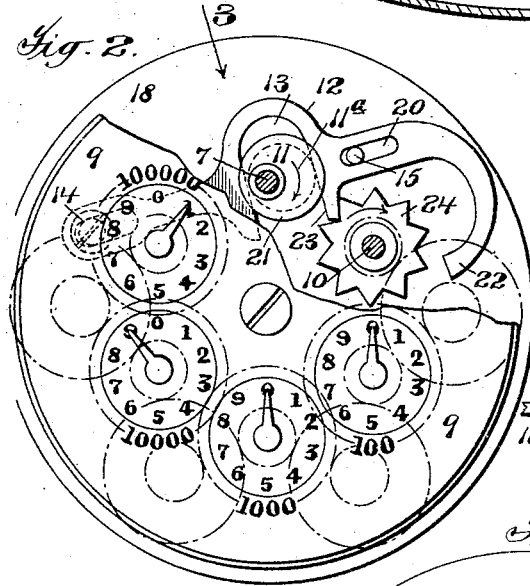
Figure 3:
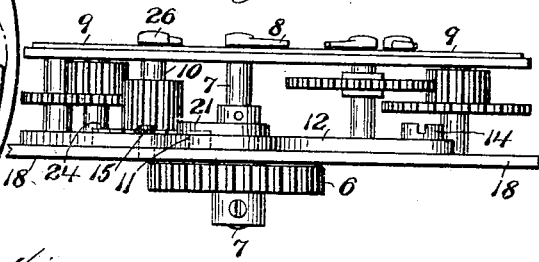
Figure 4:
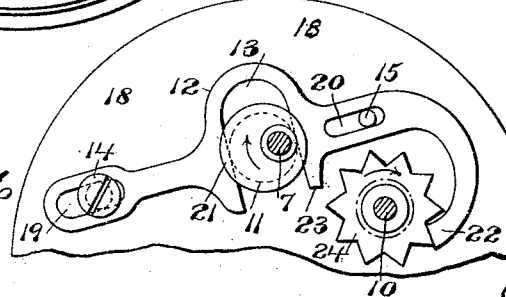
Figure 5:
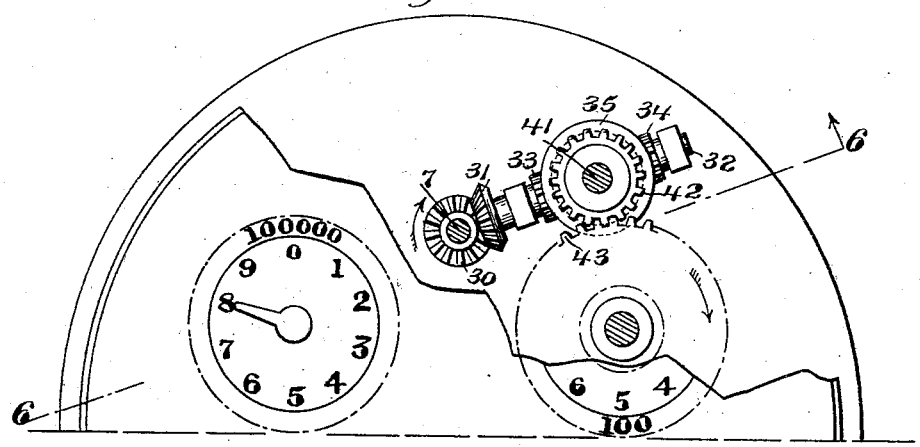
Figure 6:
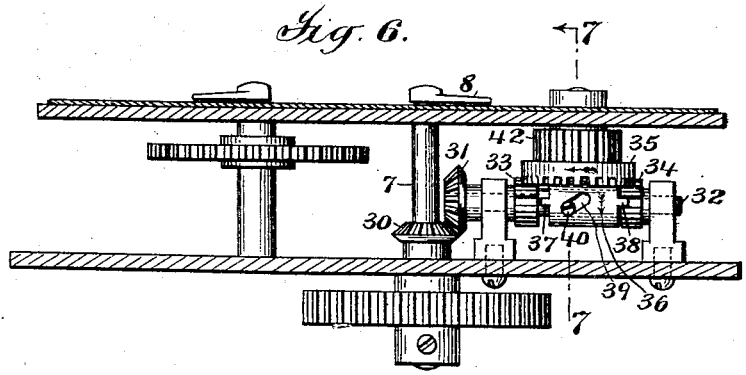
Figure 7:
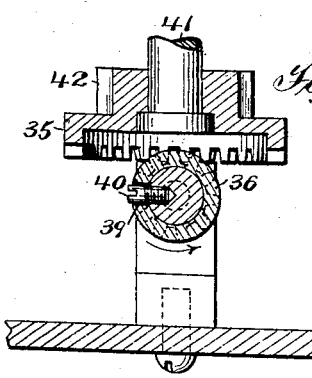

Figure 1 is a central sectional view of one form of water-meter to which my invention is applied. Fig. 2 is an enlarged plan view of the register, having the dial-plate partly broken away. Fig. 3 is a side view of the register looking at Fig. 2 in the direction of the arrow 3. Fig. 4 is a partial sectional plan of the register, showing a different position of the parts. Fig. 5 is a partial plan view of a register, showing another modification, the dial-plate being partly broken away. Fig. 6 is a sectional view taken on line 6 6 of Fig. 5. Fig. 7 is a sectional view taken on line 7 7 of Fig. 6, but drawn to a larger scale.

While it will be evident that I do not limit my invention to any particular form of meter, in Fig. 1 I have represented a well-known type of water-meter having a disk piston 1 capable of being operated by water flowing through the meter in either direction, but arranged to be connected up normally in a service-pipe with the inlet at 2 and the outlet at 3. The spindle 4 of the disk piston 1 actuates the spindle 5, which in turn communicates its motion in any suitable manner, as through reducing-gears, to the pinion 6, which is fast to the spindle 7, Figs. 1, 2, and 3, carrying the index or pointer 8 for the units or first dial of the register dial-plate 9. With this construction the motion of the units or other fast-speeding index will always indicate the way in which the meter is connected up—that is, it will turn round on its dial from zero to "1," "2," "3," &c., in the regular way when the meter is connected up properly to admit the water at the inlet 2, but will turn backward when the meter is wrongly connected.

Assuming that the fast-speeded spindle 7 is the units-spindle, as shown, then I introduce a device whereby the rotary motion of the units-spindle 7 in either direction will impart rotary motion to the tens-spindle 10 always in the same direction, so that the parts of the register beyond the units-dial will add up constantly all motion of the measuring device regardless of the direction of motion of the latter.

To the spindle 7 I suitably secure an eccentric 11, Figs. 2 and 4, adapted to reciprocate a feed-slide 12, which latter has a recess 13 in which the eccentric 11 works. The slide 12 is guided in its reciprocations by means of studs 14 and 15, secured to the gear-plate 18, which studs engage in slots 19 and 20, respectively, in the slide 12. The eccentric 11 is shown with a flange 21 above the feed-slide 12 to prevent the latter from being displaced vertically.

The reciprocating feed-slide has two pawl portions or pallets 22 23, which engage the teeth of the star-wheel 24, fast on the tens-spindle 10, the pallet 22 only releasing the star-wheel when the pallet 23 is moving it forward, Fig. 2, and the pallet 23 in turn only releasing the star-wheel when the pallet 22 is engaged with it to move it forward, Fig. 4. This feed-slide 12 always moves the star-wheel in the direction of its arrow and with its pallets 22 and 23 acts as an escapement to prevent any motion of the star-wheel not imparted to it by the slide.

When the meter is operated normally, the spindle 7 and its eccentric 11 rotate in the direction of the arrow 11ª, Fig. 2; but it will be evident that in whichever direction this spindle 7 and eccentric 11 rotate the eccentric will reciprocate the slide 12—that is, will give it one forward and one backward motion at each complete rotation. The parts are so calculated that at each complete turn of the eccentric 11 the star-wheel 24, fast on the tens-spindle 10, will be moved one tooth forward in the direction of its arrow, the pallets 22 and 23 each giving it practically half this motion. There being ten teeth on the star-wheel 24, each time the units-spindle 7 makes a complete rotation to carry its index 8 around its dial the tens-spindle 10, carrying the index 26 for the tens-dial, will move one-tenth of a revolution, no matter whether the index 8 has moved forward or backward.

While I prefer to place this transmitting device 12 between the units-spindle and the tens-spindle to have the units-index indicate how the meter is connected up, it will be evident that this device or its equivalent may be placed at any point.

The device described in reference to Figs. 1, 2, and 3 moves the tens-spindle forward one tooth intermittently during a part of each half-rotation of the units or fast-speeded spindle.

In the construction shown in Figs. 5 to 7 there is a continuous motion imparted to the tens-spindle as the units-spindle rotates, the motion of the tens-spindle being reduced to one-tenth that of the units-spindle. Referring to these Figs. 5 to 7, the units-spindle 7 has fixed thereto a bevel-pinion 30, meshing with a bevel-pinion 31, fast to the shaft 32. Freely mounted rotatively upon the shouldered shaft 32 are two pinions 33 and 34, meshing with the crown-wheel 35, preferably at points diametrically opposite. On the enlarged portion of the spindle 32, between the pinions 33 and 34, I mount freely a sleeve 36, having at each end a projection 37 38, adapted to enter between the teeth of the pinions 33 and 34, respectively. Through the sleeve 36 is cut a slanting slot 39, and a pin 40, engaging in the slot 39, is secured in the spindle 32. When the spindle 32 is rotated, its pin 40 will ride in the slot 39, moving the sleeve longitudinally on the spindle 32 until the pin 40 reaches the forward end of the slot calculated from the direction of motion of the pin either way. Referring to Figs. 6 and 7, it will be seen that when the spindle 32 and its pin 40 are rotated in the direction of the arrow in Fig. 7, pin 40 will work its way to the lower end (looking at Fig. 6) of the slot 39 by pushing the sleeve 36 to the right, after which the sleeve 36 will be carried along or rotated by the pin 40 and its spindle 32. It will also be seen that in this position of the sleeve 36 its projection 38 is engaged in a space between two teeth of the pinion 34, whereby the said pinion 34 is also made to rotate with the spindle 32. Considering the direction of motion of these parts, it will be seen that the crown-wheel 35 will be rotated in the direction of its arrow. The pinion 33 being free will be rotated by crown-wheel 35 without producing any effect. Assuming now that units-spindle 7 rotates the spindle 32 in the opposite direction the pin 40 will push the sleeve 36 to the left and come to the opposite end of the slot 39, (upper end looking at Fig. 6,) thus causing the projection 37 to engage in the pinion 33, while at the same time withdrawing the projection 38 from engagement with the pinion 34. The spindle 32 then carries the sleeve 36 and the pinion 33 with it in a direction opposite that indicated by the arrow in Figs. 6 and 7; but it will be seen that this motion of the pinion 33 will impart motion to the crown-wheel 35 in the direction of its arrow the same as when the crown-wheel was rotated by the pinion 34. Now the pinion 34 being disengaged is rotated by the crown-wheel 35 without producing any effect.

From the foregoing it is evident that in whichever direction the spindle 32 is rotated the direction of rotation of the pinions 33 and 34 and of the crown-wheel 35 will always remain the same, because when the spindle 32 moves in one direction it engages one pinion and when it moves in the other direction it engages the other pinion, which pinions being on one shaft in engagement with a crown-wheel must always move in opposite directions.

The parts are so constructed that one of the projections 37 or 38 on sleeve 36 must engage with its pinion before the other projection has become disengaged from its pinion, so that the sleeve 36 can never take such a position that it will not engage with and operate one of the pinions 33 or 34, consequently making a positively-acting movement.

The crown-wheel 35 is carried by the stud 41 and has fast thereto a pinion 42, constituting an intermediate gear-wheel to convey motion to the tens-spindle or next higher graduation.

With the construction just described the rotation of the first index-spindle 7 in either direction imparts continuous motion to the next index-spindle 9, always in the same constant direction.

By giving one of the pinions 33 34 more teeth than the other the proportionate rate of speed between the units and tens spindles will vary according to the direction of rotation of the units-spindle. Consequently, assuming that in the normal running of the meter the pinion 33 is engaged by the sleeve 36 and pinion 34 is given one more tooth than pinion 33, then should the meter be connected up in the wrong direction the register would run up faster for the same amount of water passing through the meter than when connected up normally to punish fraudulent practice.

I claim as my invention—

1. The combination of a water-meter adapted to be connected up in a water service-pipe in either direction and provided with a measuring device adapted to measure water passing through the said meter in either direction, with means actuated by said measuring device for registering the total amount of fluid passing through the meter in either or both directions, said means comprising a series of movable parts interlocked to prevent independent motion.

2. The combination of a water-meter adapted to be connected up in a water service-pipe in either direction and provided with a rotary measuring device adapted to be rotated by, and measure, water passing through the meter in either direction, with means actuated by said measuring device to register the total amount of rotary motion of said device in either or both directions, said means comprising a series of movable parts interlocked to prevent independent motion.

3. The combination of a water-meter adapted to be connected up in a water service-pipe in either direction and provided with a measuring device adapted to measure water passing through the meter in either direction, with a registering mechanism mechanically actuated by said measuring device, said registering mechanism having indexes of various denominations adapted to rotate in a predetermined direction, and means whereby the rotation of some of said indexes is reversed and the rotation of some of them is not when the direction of the motion of the measuring device is reversed.

4. In a meter, a measuring device adapted to be actuated by fluid passing through the meter in the normal direction or in the reverse direction, registering mechanism, and means for running up the said mechanism at a certain rate proportionate to the motion of the measuring device when normally actuated, said means adapted to continue to run up the said registering mechanism but at a higher proportionate rate when the measuring device is actuated in the reverse direction.

In testimony whereof I have signed my name to this specification in the presence of two subscribing witnesses.

FRANK LAMBERT.

Witnesses:
MABELLE F. LAKE,
EDITH J. GRISWOLD.